(12) United States Patent
Salowe et al.

(10) Patent No.: US 9,104,830 B1
(45) Date of Patent: Aug. 11, 2015

(54) METHODS, SYSTEMS, AND ARTICLES OF MANUFACTURE FOR ASSIGNING TRACK PATTERNS TO REGIONS OF AN ELECTRONIC DESIGN

(71) Applicant: Cadence Design Systems, Inc., San Jose, CA (US)

(72) Inventors: Jeffrey Salowe, Los Gatos, CA (US); Satish Raj, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/931,627

(22) Filed: Jun. 28, 2013

(51) Int. Cl.
    *G06F 17/50* (2006.01)

(52) U.S. Cl.
    CPC .......... *G06F 17/5077* (2013.01); *G06F 17/509* (2013.01); *G06F 17/5045* (2013.01); *G06F 17/5054* (2013.01); *G06F 17/5068* (2013.01); *G06F 17/5072* (2013.01)

(58) Field of Classification Search
    CPC ............ G06F 17/5077; G06F 17/5068; G06F 17/5072; G06F 17/5054; G06F 17/509; G06F 17/5045; G06F 17/5091
    USPC ......................................... 716/126, 129, 130
    See application file for complete search history.

(56) References Cited

U.S. PATENT DOCUMENTS

| | | | |
|---|---|---|---|
| 2,915,831 A | 12/1959 | Parker | |
| 4,484,292 A | 11/1984 | Hong et al. | |
| 4,811,237 A | 3/1989 | Putatunda et al. | |
| 5,535,134 A | 7/1996 | Cohn et al. | |
| 5,644,500 A | 7/1997 | Miura et al. | |
| 5,729,469 A | 3/1998 | Kawakami | |
| 5,770,481 A | 6/1998 | Fujii | |
| 5,781,446 A | 7/1998 | Wu | |
| 5,801,959 A | 9/1998 | Ding et al. | |
| 6,011,912 A | 1/2000 | Yui et al. | |
| 6,298,468 B1 | 10/2001 | Zhen | |
| 6,324,675 B1 | 11/2001 | Dutta et al. | |
| 6,349,403 B1 | 2/2002 | Dutta et al. | |
| 6,370,673 B1 | 4/2002 | Hill | |
| 6,407,434 B1 | 6/2002 | Rostoker et al. | |
| 6,490,713 B2 | 12/2002 | Matsumoto | |

(Continued)

OTHER PUBLICATIONS

"Li et al., "NEMO: A New Implicit-Connection Graph-Based Gridless Router With Multilayer Planes and Pseudo Tile Propagation,"" IEEE Trans. on CAD of ICs & Systems, vol. 26, No. 4 Apr. 2007, pp. 705-718.

(Continued)

*Primary Examiner* — Stacy Whitmore
*Assistant Examiner* — Magid Dimyan
(74) *Attorney, Agent, or Firm* — Vista IP Law Group, LLP

(57) ABSTRACT

Disclosed are methods, systems, and articles of manufacture for assigning track patterns to regions of an electronic design in one or more embodiments. One aspect tessellates an area on a layer of an electronic design that is subject to one or more track pattern requirements and dynamically maintains the tessellation structure from the tessellation process for early stages of the design process such as floorplanning, placement, or routing. Another aspect identifies or creates multiple strips or multiple regions for an area on a layer of an electronic design and assigns or associates a track pattern or a track pattern group to each of the multiple strips or multiple regions. In this latter aspect, a track pattern or a track pattern group is no longer required to apply to the entire layer.

20 Claims, 12 Drawing Sheets

(56) References Cited

U.S. PATENT DOCUMENTS

| | | |
|---|---|---|
| 6,505,333 B1 | 1/2003 | Tanaka |
| 6,543,041 B1 | 4/2003 | Scheffer et al. |
| 6,557,145 B2 | 4/2003 | Boyle et al. |
| 6,557,153 B1 | 4/2003 | Dahl et al. |
| 6,609,237 B1 | 8/2003 | Hamawaki et al. |
| 6,763,512 B2 | 7/2004 | Xing |
| 6,769,105 B1 | 7/2004 | Teig et al. |
| 6,813,755 B2 | 11/2004 | Xing |
| 6,851,100 B1 | 2/2005 | You et al. |
| 6,892,371 B1 | 5/2005 | Teig et al. |
| 6,931,616 B2 | 8/2005 | Teig et al. |
| 6,938,226 B2 | 8/2005 | Nguyen et al. |
| 6,938,234 B1 | 8/2005 | Teig et al. |
| 6,957,407 B2 | 10/2005 | Suto |
| 6,957,411 B1 | 10/2005 | Teig et al. |
| 6,981,235 B1 | 12/2005 | Salowe et al. |
| 6,996,512 B1 | 2/2006 | Alpert et al. |
| 7,016,794 B2 | 3/2006 | Schultz |
| 7,039,881 B2 | 5/2006 | Regan |
| 7,051,313 B1 | 5/2006 | Betz et al. |
| 7,076,750 B1 | 7/2006 | Lukanc |
| 7,089,526 B1 | 8/2006 | Salowe et al. |
| 7,096,445 B1 | 8/2006 | Pucci et al. |
| 7,100,128 B1 | 8/2006 | Nequist et al. |
| 7,107,564 B1 | 9/2006 | Teig et al. |
| 7,117,468 B1 | 10/2006 | Teig et al. |
| 7,139,993 B2 | 11/2006 | Proebsting et al. |
| 7,222,322 B1 | 5/2007 | Chyan |
| 7,257,797 B1 | 8/2007 | Waller et al. |
| 7,363,607 B2 | 4/2008 | Birch et al. |
| 7,516,433 B1 | 4/2009 | Pucci et al. |
| 7,523,430 B1 | 4/2009 | Patel |
| 7,594,214 B1 | 9/2009 | Salowe et al. |
| 7,640,520 B2 | 12/2009 | Wang et al. |
| 7,657,852 B2 | 2/2010 | Waller |
| 7,694,261 B1 | 4/2010 | Chyan et al. |
| 7,735,043 B2 | 6/2010 | Ueda |
| 7,752,590 B1 | 7/2010 | Chyan et al. |
| 7,802,208 B1 | 9/2010 | Waller et al. |
| 7,890,909 B2 * | 2/2011 | Pyapali et al. ............... 716/129 |
| 7,934,177 B2 | 4/2011 | Shin |
| 7,958,480 B1 | 6/2011 | Slonim et al. |
| 8,006,216 B1 | 8/2011 | Chen et al. |
| 8,028,253 B2 | 9/2011 | Drapeau |
| 8,032,856 B2 * | 10/2011 | Itagaki ..................... 716/139 |
| 8,045,546 B1 | 10/2011 | Bao et al. |
| 8,050,256 B1 | 11/2011 | Bao et al. |
| 8,108,823 B2 | 1/2012 | Allen et al. |
| 8,239,806 B2 | 8/2012 | Chen et al. |
| 8,250,507 B1 | 8/2012 | Agarwal et al. |
| 8,286,111 B2 | 10/2012 | Chandra et al. |
| 8,375,348 B1 | 2/2013 | Raj et al. |
| 8,418,110 B2 | 4/2013 | Keinert et al. |
| 8,473,885 B2 | 6/2013 | Cohn et al. |
| 8,490,036 B2 | 7/2013 | Waller |
| 8,495,547 B2 | 7/2013 | Keinert et al. |
| 8,495,549 B2 | 7/2013 | Maruyama et al. |
| 8,510,703 B1 | 8/2013 | Wadland et al. |
| 8,560,998 B1 | 10/2013 | Salowe et al. |
| 8,612,914 B2 | 12/2013 | Sherlekar et al. |
| 8,640,080 B1 | 1/2014 | Salowe et al. |
| 8,645,893 B1 | 2/2014 | Yeung et al. |
| 8,671,368 B1 | 3/2014 | Salowe et al. |
| 8,683,418 B2 | 3/2014 | Bose et al. |
| 8,689,121 B2 | 4/2014 | O'Riordan |
| 8,737,392 B1 | 5/2014 | Bao et al. |
| 8,769,455 B1 | 7/2014 | Singh et al. |
| 8,782,586 B2 | 7/2014 | Sezginer et al. |
| 2001/0038612 A1 | 11/2001 | Vaughn |
| 2003/0014201 A1 | 1/2003 | Schultz |
| 2003/0084418 A1 | 5/2003 | Regan |
| 2003/0126578 A1 | 7/2003 | Wadland et al. |
| 2004/0143797 A1 | 7/2004 | Nguyen et al. |
| 2006/0288323 A1 | 12/2006 | Birch |
| 2007/0044060 A1 | 2/2007 | Waller |
| 2007/0101303 A1 | 5/2007 | Lien |
| 2007/0106969 A1 | 5/2007 | Birch et al. |
| 2007/0162884 A1 | 7/2007 | Matsuno et al. |
| 2007/0245286 A1 | 10/2007 | Ueda |
| 2008/0072182 A1 | 3/2008 | He et al. |
| 2008/0244504 A1 | 10/2008 | Drapeau |
| 2009/0055792 A1 | 2/2009 | Itagaki |
| 2009/0144688 A1 | 6/2009 | Uchino et al. |
| 2009/0172628 A1 | 7/2009 | Chyan |
| 2010/0011327 A1 | 1/2010 | Becker et al. |
| 2010/0037200 A1 | 2/2010 | Ghan |
| 2010/0100862 A1 | 4/2010 | Ohtsuka |
| 2010/0106274 A1 | 4/2010 | Konno et al. |
| 2010/0115479 A1 | 5/2010 | Hatano et al. |
| 2010/0122227 A1 | 5/2010 | Waller |
| 2010/0122228 A1 * | 5/2010 | McCracken et al. ............... 716/6 |
| 2010/0199253 A1 | 8/2010 | Cheng et al. |
| 2010/0205575 A1 | 8/2010 | Arora et al. |
| 2010/0229140 A1 | 9/2010 | Strolenberg et al. |
| 2010/0306727 A1 | 12/2010 | Itagaki |
| 2011/0014799 A1 | 1/2011 | Sezginer |
| 2011/0055784 A1 * | 3/2011 | Gao et al. ..................... 716/125 |
| 2011/0119648 A1 | 5/2011 | Chen et al. |
| 2011/0185329 A1 | 7/2011 | Wen et al. |
| 2011/0214100 A1 * | 9/2011 | McElvain ..................... 716/130 |
| 2011/0219341 A1 | 9/2011 | Cao et al. |
| 2011/0260318 A1 | 10/2011 | Eisenstadt |
| 2011/0296360 A1 | 12/2011 | Wang et al. |
| 2012/0079442 A1 | 3/2012 | Akar et al. |
| 2012/0131528 A1 | 5/2012 | Chen et al. |
| 2012/0241986 A1 | 9/2012 | Sherlekar et al. |
| 2012/0286331 A1 | 11/2012 | Aton et al. |
| 2013/0019220 A1 * | 1/2013 | Maruyama et al. ........... 716/126 |
| 2013/0036396 A1 | 2/2013 | Arayama et al. |
| 2013/0086543 A1 * | 4/2013 | Agarwal et al. ............. 716/119 |
| 2013/0086545 A1 * | 4/2013 | Alpert et al. ................. 716/129 |
| 2013/0155555 A1 | 6/2013 | Blanc et al. |
| 2013/0159965 A1 * | 6/2013 | Karatal et al. ................ 717/105 |
| 2014/0157220 A1 | 6/2014 | Arayama et al. |
| 2014/0167117 A1 | 6/2014 | Quandt et al. |

OTHER PUBLICATIONS

"Lin et al., "Double Patterning Lithography Aware Grid less Detailed Routing with Innovative Conflict Graph,"" DAC'1 0, Jun. 13-18, 2010, pp. 398-403.

Agilent Technologies, "Momentum", 2006, Agilient, pp. 1-40.

Cho et al., "Double Patterning Technology Friendly Detailed Routing", IEEE/ACM International Conference, 2008, pp. 506-511.

Dion et al., Contour: A Tile-based Gridless Router, 30 pages, Western Research Laboratory, Mar. 1995.

Non-Final Office Action dated Sep. 19, 2013 for U.S. Appl. No. 13/602,071.

Notice of Allowance dated Mar. 21, 2014 for U.S. Appl. No. 13/602,071.

Notice of Allowance dated Jul. 14, 2014 for U.S. Appl. No. 13/602,071.

Ex-parte Quayle Office Action dated May 23, 2014 for U.S. Appl. No. 13/602,069.

Non-Final Office Action dated Sep. 20, 2013 for U.S. Appl. No. 13/602,069.

Final Office Action dated Oct. 4, 2013 for U.S. Appl. No. 13/705,164.

Non-Final Office Action dated Jun. 5, 2013 for U.S. Appl. No. 13/705,164.

Non-Final Office Action dated Sep. 3, 2014 for U.S. Appl. No. 13/705,164.

Notice of Allowance dated Jan. 22, 2014 for U.S. Appl. No. 13/705,164.

Notice of Allowance dated May 16, 2014 for U.S. Appl. No. 13/705,164.

Non-Final Office Action dated Dec. 6, 2013 for U.S. Appl. No. 13/931,689.

Notice of Allowance dated Jun. 4, 2014 for U.S. Appl. No. 13/931,689.

Non-Final Office Action dated Jun. 13, 2014 for U.S. Appl. No. 13/931,627.

(56) References Cited

OTHER PUBLICATIONS

Final Office Action dated Jul. 17, 2014 for U.S. Appl. No. 13/931,503.
Non-Final Office Action dated Apr. 2, 2014 for U.S. Appl. No. 13/931,503.
Final Office Action dated May 1, 2014 for U.S. Appl. No. 13/931,707.
Non-Final Office Action dated Oct. 28, 2013 for U.S. Appl. No. 13/931,707.
Non-Final Office Action dated Aug. 4, 2014 for U.S. Appl. No. 13/931,568.
Hsu et al., "Template-Mask Design Methodology for Double Patterning Technology," 2010 IEEE, pp. 107-111.
Non-Final Office Action dated Jul. 15, 2014 for U.S. Appl. No. 14/044,838.
Jeffrey Salowe, "Gridding for Advanced Process Nodes" 2012.
Hwang, Chanseok, and Massoud Pedram. "Interconnect design methods for memory design." Proceedings of the 2004 Asia and South Pacific Design Automation Conference. IEEE Press, 2004.
Jones, David L., "PCB Design Tutorial, Revision A", Jun. 29, 2004, David L. Jones and www.alternatezone.com, pp. 1-25.
Ou, Hung-Chih, Hsing-Chih Chang Chien, and Yao-Wen Chang. "Simultaneous analog placement and routing with current flow and current density considerations." Proceedings of the 50th Annual Design Automation Conference. ACM, 2013.
Lin, I-Jye, Tsui-Yee Ling, and Yao-Wen Chang. "Statistical circuit optimization considering device and interconnect process variations." Proceedings of the 2007 international workshop on System level interconnect prediction. ACM, 2007.
Pompl, T., et al. "Practical aspects of reliability analysis for IC designs." Proceedings of the 43rd annual Design Automation Conference. ACM, 2006.
U.S. Appl. No. 13/602,069, filed Aug. 31, 2012.
U.S. Appl. No. 13/602,071, filed Aug. 31, 2012.
U.S. Appl. No. 13/692,970, filed Dec. 3, 2012.
U.S. Appl. No. 13/705,164, filed Dec. 4, 2012.
Wang, Laung-Terng, Charles E. Stroud, and Nur A. Touba. System-on-chip test architectures: nanometer design for testability. Morgan Kaufmann, 2010.
Singh, Jaskirat, and Sachin S. Sapatnekar. "Topology optimization of structured power/ground networks." Proceedings of the 2004 international symposium on Physical design. ACM, 2004.
Notice of Allowance dated Sep. 25, 2014 for U.S. Appl. No. 13/931,707.
Notice of Allowance dated Nov. 10, 2014 for U.S. Appl. No. 13/931,503.
Non-Final Office Action dated Dec. 19, 2014 for U.S. Appl. No. 14/318,507.
Final Office Action dated Dec. 31, 2014 for U.S. Appl. No. 13/931,568.
Notice of Allowance dated Dec. 31, 2014 for U.S. Appl. No. 13/931,689.
Non-Final Office Action dated Mar. 10, 2015 for U.S. Appl. No. 14/318,507.
Notice of Allowance dated Apr. 8, 2015 for U.S. Appl. No. 13/931,568.
Non-Final Office Action dated Apr. 10, 2015 for U.S. Appl. No. 13/931,689.

* cited by examiner

METHODS, SYSTEMS, AND ARTICLES OF MANUFACTURE FOR ASSIGNING TRACK PATTERNS TO REGIONS OF AN ELECTRONIC DESIGN

CROSS-REFERENCE TO RELATED APPLICATION(S)

This application is related to U.S. patent application Ser. No. 13/931,568 and entitled "METHODS, SYSTEMS, AND ARTICLES OF MANUFACTURE FOR INTERACTIVELY IMPLEMENTING PHYSICAL ELECTRONIC DESIGNS WITH TRACK PATTERNS", U.S. patent application Ser. No. 13/931,689 and entitled "METHODS, SYSTEMS, AND ARTICLES OF MANUFACTURE FOR ASSOCIATING TRACK PATTERNS WITH ROUTING FOR ELECTRONIC DESIGNS", U.S. patent application Ser. No. 13/931,503 and entitled "METHODS, SYSTEMS, AND ARTICLES OF MANUFACTURE FOR IMPLEMENTING A PHYSICAL ELECTRONIC DESIGN WITH AREA-BOUNDED TRACKS", and U.S. patent application Ser. No. 13/931,707 and entitled "METHODS, SYSTEMS, AND ARTICLES OF MANUFACTURE FOR AUTOMATICALLY ASSIGNING TRACK PATTERNS TO REGIONS FOR PHYSICAL IMPLEMENTATION OF AN ELECTRONIC DESIGN", the content of all four U.S. patent applications is hereby expressly incorporated by reference in its entirety for all purposes.

COPYRIGHT NOTICE

A portion of the disclosure of this patent document includes material, which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. The task of all routers is the same—routers are given some pre-existing polygons consisting of pins on cells and optionally some pre-routes from the placers to create geometries so that all pins assigned to different nets are connected by wires and vias, that all wires and vias assigned to different nets do not overlap, and that all design rules are obeyed. That is, a router fails when two pins on the same net that should be connected are open, when two pins on two different nets that should remain open are shorted, or when some design rules are violated during routing.

A layout file is created from the placement and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process.

Traditionally, layout track pattern is consist of parallel tracks with uniform pitches, and the tracks cover entire coordinate space. This conventional approach does not satisfy the needs for electronic layout with a typical half-pitch of 14 nm or below. With the typical half-pitch advancing to 14 nm or below, the track patterns for a certain metal layer may be required or desired to be region based where one track pattern may be associated with or assigned to a region on one layer, while another track pattern may be associated with or assigned to another region on the same layer. Some designs may even demand or desire non-uniform track patterns. Conventional approaches do not allow periodic changes of track pitches and definitions of regions where one or more track patterns are active. These track pattern requirements pose a challenge for physical design implementation, especially for interactive layout editing. In addition, users may need to interactively define track pattern(s) during the chip floorplanning or placement stage and follow such track pattern(s) during subsequent physical design stages such as routing, post-layout optimization, engineering change order (ECO), or even specific physical design tasks such as wire editing.

In addition, advanced manufacturing groups have new requirements on where wires or interconnects may be routed. In particular, some routing tracks are intended for double-width wires, some are intended for single-width wires, and so on. Routing tracks, as they were originally devised, applied to every net or connection in the design. To address this, the user must explicitly add the constraints of the track patterns to the routing rules, which is impractical and prone to errors. Moreover, there has been no way to address trackPattern constraints on automatically-generated rules. Some advanced technologies have complex grid requirements. One such requirement is to restrict routing grids in a particular area. Another approach is to give several possible sets of grids, and then to assign one to a given area. The current track pattern representation applies to an entire layer. There is no representation that limits the bounds of a track pattern. Nor is there a representation that maps track patterns to a particular area Thus, there exists a need for methods, systems, and articles of manufacture for assigning track patterns to regions of an electronic design.

SUMMARY

Disclosed are method(s), system(s), and article(s) of manufacture for assigning track patterns to regions of an electronic design in one or more embodiments. One aspect is directed at tessellating an area on a layer of an electronic design subject to one or more track pattern requirements, and dynamically maintaining the tessellation structure obtained or derived from the tessellation during early stages of the implementation of the electronic design such as floorplanning, placement, or routing. The tessellation pattern or the tessellation structure is constructed by taking the track patterns or track pattern groups into consideration and thus may be used to guide the implementation of the electronic design, while complying with the requirements explicitly specified or implicitly derived from the track patterns or track pattern groups. Another aspect is directed at identifying or creating multiple sub-areas for an area on a layer of an electronic design, and assigning or associating a track pattern or a track pattern group to each of the sub-areas, instead of applying a track pattern or a track pattern group to the entire layer.

Various embodiments ensure that electronic designs are implemented during early stages of the design process (e.g., floorplanning, placement, or routing) to comply with not only the various design rules but also the additional track pattern requirements. Some embodiments ensure that electronic designs are implemented during early stages of the design process in a correct-by-construction manner to comply with not only the various design rules but also the additional track pattern requirements while the electronic design is being implemented and prior to the performance of any design rule check (DRC) process or post-route optimization processes.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for implementing high current carrying interconnects. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for associating track patterns with rules for electronic designs in one or more embodiments. One aspect is directed at associating a rule with one or more track patterns by at least creating or identifying a rule that is used to guide electronic design implementation tools to implement electronic designs, identifying or creating one or more track patterns, and associating the created or identified rule with the one or more track patterns. As the rule is used to guide physical implementation tools, the association of a rule and track patterns enables the physical implementation tools to implement an electronic design while satisfying both the requirements or constraints of the rule and the requirements or constraints of the track patterns.

Another aspect is directed at interpretation or automatic association or assignment of a layer constraint (e.g., a track-Pattern constraint) by at least determining whether a track pattern on a layer with a first rule match a second rule, and adding the track pattern to the layer constraint for the second rule on the layer. Another aspect is directed at automatic creation of a rule by creating a new rule, examining each track pattern associated with a first rule, determining whether the new rule matches the first rule, and adding the track pattern to a layer constraint (e.g., a trackPattern constraint) for the new rule. Various details of any of the processes, sub-processes, or acts are further provided below with reference to respective drawing figures.

Figure 1:
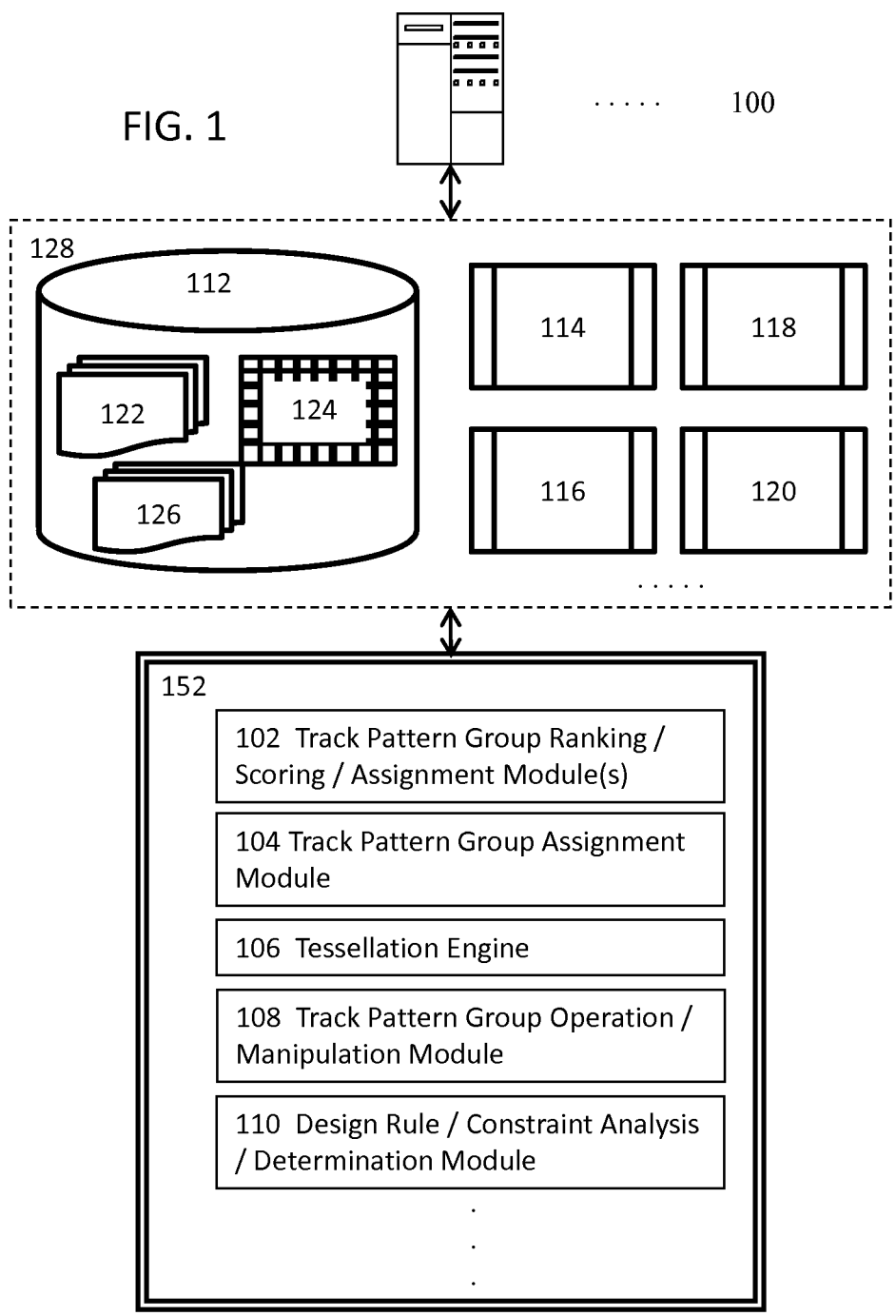
FIG. 1 illustrates a high level block diagram for a system for assigning track patterns to regions of an electronic design in some embodiments.

FIG. 1 illustrates a high level block diagram for a system for interactively implementing physical electronic designs with track patterns in some embodiments. In one or more embodiments, the system for interactively implementing physical electronic designs with track patterns may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114, a layout editor 116, a design rule checker 118, a verification engine 120, a floorplanner, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), libraries, data, rule decks, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises a track pattern or track pattern group module 102 to rank or score a plurality of track patterns based on one or more criteria, an interactive design editing module 104 to provide the capabilities of interactive editing (e.g., adding, removing, or modifying) any part of an electronic design, a tessellation module 106 to tessellate an area of an electronic design into strips and to tessellate a strip into multiple regions either alone or jointly with one or more other modules, one or more interactive coloring modules 108 to provide interactive coloring capabilities for providing correct-by-construction electronic designs to be manufactured with multi-exposure techniques, various physical implementation tools such as a global router or a detail router, a layout or physical design editor, one or more modules 110 to perform design rule checks, constraint analysis (e.g., interactive constraint analysis), or to make various determinations, a constraint or connectivity awareness module 112 to provide a constraint and/or connectivity-aware environment to implement electronic designs, etc.

For example, the method or system may interactively check whether an electronic design complies with various constraints or design rules (collectively constraints), such as some net-based spacing constraints that impose some limitations on the spacing between two nets, in a nearly real-time manner while the electronic design is being created in some embodiments. In these embodiments, the disclosed method or system uses the connectivity information provided by a connectivity engine or assigned by a designer to present feedback to a user as to whether a newly created object or a newly modified object complies or violates certain relevant constraints in an interactive manner or in nearly real-time without having to perform such constraints checking in batch mode. More details about the aforementioned modules will become clear and self-explanatory in the remainder of the description with reference to various other drawing figures.

Figure 2:
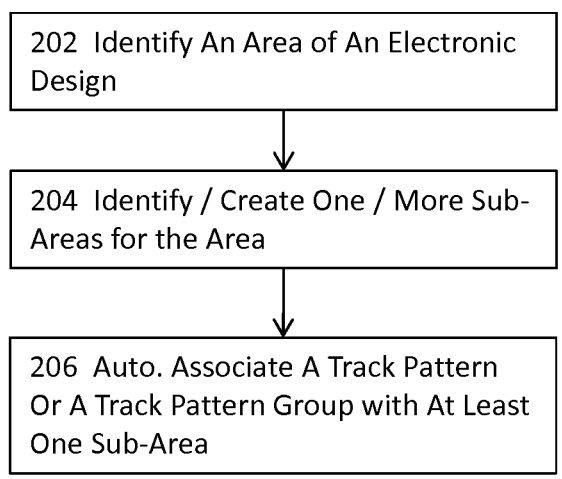
FIG. 2 illustrates a high level flow diagram for assigning track patterns to regions of an electronic design in some embodiments.

FIG. 2 illustrates a high level flow diagram for assigning track patterns to regions of an electronic design in some embodiments. In one or more embodiments, the method for assigning track patterns to regions of an electronic design may comprise the process 202 of identifying an area of an electronic design. An area may comprise at least a portion of a layer of an electronic design. For example, an area identified at 202 may include the entire electronic design on a layer, an automated created or manually or user defined, smaller portion of the entire electronic design on a layer, a block in the electronic design (e.g., an instance of an IP (intellectual property) block), etc. in various embodiments.

In some of these embodiments, the method may comprise the process 204 of identifying or creating one or more sub-areas for the area. In some embodiments, a sub-area comprises a strip. In some other embodiments, a sub-area comprises a region of a strip. More details about strips and regions will be provided below with reference to at least FIG. 2B.

In some of these embodiments, the method may comprise the process 206 of automatically associating a track pattern or a track pattern group with at least one sub-area. By associating a pattern group with a sub-area, physical implementation of the electronic design within the region are required to comply with various rules, requirements, constraints (collectively "requirements") as required or desired by the track pattern and its associated rules (e.g., one or more routing rules used to guide the routing engine to route the electronic design), unless some of such requirements may be relaxed (e.g., a soft requirement which, when violated, incurs some penalty) or ignored (e.g., a don't-care requirement that incurs no penalty even when violated). In some embodiments, process 206 may map to or associate with a sub-area one or more track patterns or one or more track pattern groups by associating area-based requirements or constraints with various rules that guide electronic design implementation tools to implement the electronic design within the sub-area to create one or more area-based requirements or constraints. In these embodiments track patterns need not apply to the entire design on one layer of an electronic design. Rather, track patterns may be associated with and thus apply to only a smaller portion of an electronic design on a layer (e.g., metal-1 layer). More details about associating track patterns with rules are described in the U.S. patent applications provided in ¶ [0001] of this application.

Figure 2A:
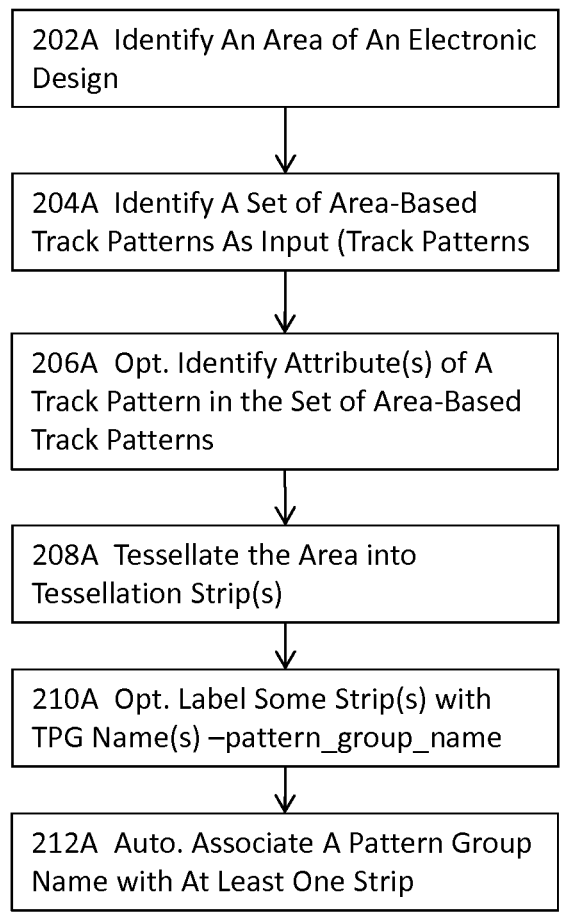
FIG. 2A illustrates a more detailed flow diagram for assigning track patterns to regions of an electronic design in some embodiments.

FIG. 2A illustrates a more detailed flow diagram for assigning track patterns to regions of an electronic design in some embodiments. In one or more embodiments, the method for assigning track patterns to regions of an electronic design may comprise the process 202A of identifying an area of an electronic design in a substantially similar manner as that described for 202 of FIG. 2.

In some embodiments, the method may comprise the process 204A of identifying a set of area-based track patterns as an input. In some embodiments, a track pattern may be provided by a customer or a foundry. In some embodiments, a track pattern may be identified from a repository such as a library or a collection of track patterns. It shall be noted that a track pattern generally covers an area and is thus deemed area-based. Nonetheless, a track pattern may also contain a single track (e.g., when the "-repeat" attribute is set to 0 in the track pattern declaration) and thus only constitutes a line which may still be considered as a degenerated area. Consequently, even a track pattern containing a single track may still be considered as area-based.

In some embodiments, the method may comprise the process 206A of optionally identifying one or more attributes of a track pattern in the set of area-based track patterns. In some embodiments, the one or more attributes of a track pattern may comprise, for example but not limited to, the identifier or name (collectively "name" or interchangeably "identifier") of the track pattern, one or more requirements (e.g., spacing from the track pattern specification or declaration, width constraint from the name of the track pattern or other sources such as the customer or foundry, the specific arrangement based on the start location or the spacing, or the "-color_pattern" attribute) that may be extracted or derived from the track pattern, one or more requirements from one or more rules associated with the track pattern (e.g., by using the "set_layer_constraint"), a track pattern group name in the specification or declaration of the track pattern.

In some embodiments, the method may comprise the process 208A of tessellating the area into one or more strips. In some embodiments, tessellation may be performed automatically as described below or may be created with, for example, the TCL (Tool Command Language) command.

In some embodiments, the method may comprise the process 210A of optionally labeling one or more strips with the identifier of a track pattern or the identifier of a track pattern group. For example, process 210A may label a strip by using a command as follows:

label_tessellation -region {xlo ylo xhi yhi} -pattern_group_name "track_pattern_name" -layer <layer>

In some embodiments, the method may comprise the process 212A of automatically associating the identifier of a track pattern group or the identifier of a track pattern with at least one strip in a substantially similar manner as that described for 206 of FIG. 2. In some embodiments, the method may further associate a layer constraint (e.g., a track-Pattern constraint) with the rule specification. For example, if the rule specification requires 1x-width for interconnects, then the associated layer constraint includes track patterns with 1x-tracks. Consider the following three exemplary track patterns:

Track pattern 1: set_track_pattern -start <start location of tracks> -name single1 -pattern_group_name 1x Track pattern 2: set_track_pattern -start <start location of tracks> -name single2 -pattern_group_name 1x+2x Track pattern 3: set_track_pattern -start <start location of tracks> -name double1 -pattern_group_name 1x+2x In the above example, if the rule specification requires 1x-width for interconnects, then the associated layer constraint should also include track patterns "singlet" and "single2". If the rule specification requires 2x-width for interconnects, then the associated layer constraint should also include track patterns "double1". Moreover, in an area associated with the "1x" track pattern group, only the 1x-tracks are active. Similarly, in an area associated with the "1x+2x" track pattern group, both the "doublet" and "single2" tracks are active. With the association of track patterns or track pattern groups with an area of an electronic design or the association of an area-based constraint with the rule specification, the appropriate tracks will be the active tracks for the electronic design implementation tools to select to implement the electronic design within the area.

Figure 2B:
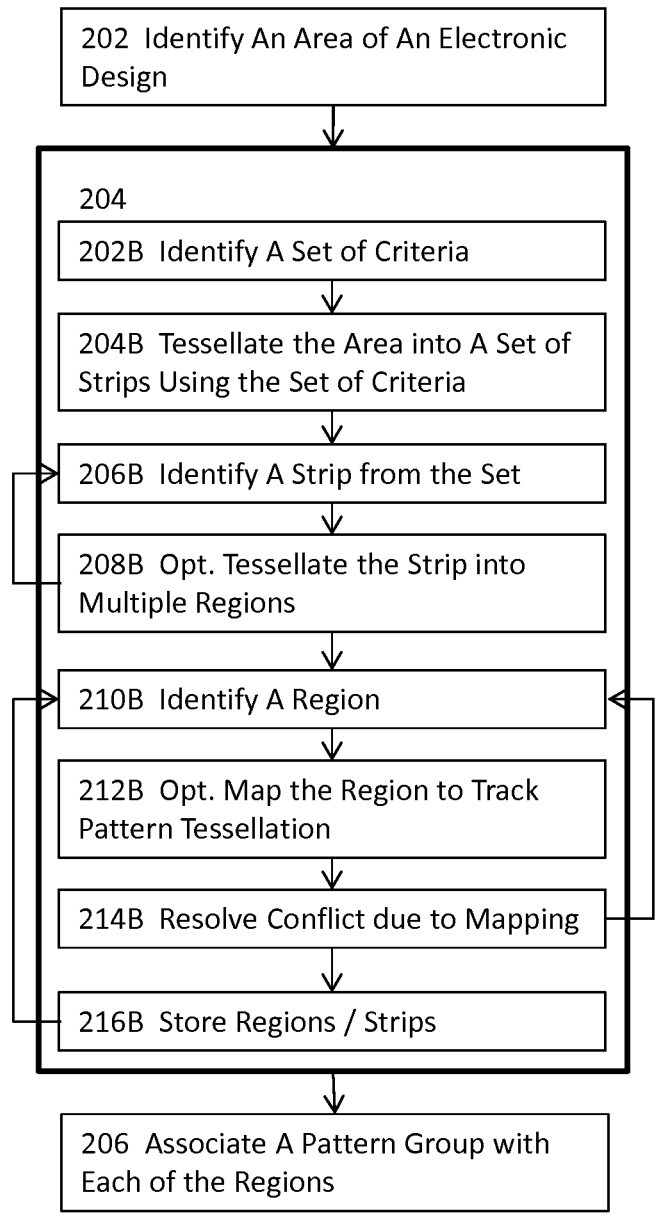
FIG. 2B illustrates a more detailed flow diagram for assigning track patterns to regions of an electronic design in some embodiments.

FIG. 2B illustrates a more detailed flow diagram for assigning track patterns to regions of an electronic design in some embodiments. In one or more embodiments, the method for assigning track patterns to regions of an electronic design may comprise the process 202 of identifying an area of an electronic design in a substantially similar manner as that described for FIG. 2.

In some embodiments, the method may comprise the process 202B of identifying a set of criteria and the process 204B of tessellating the area into a set of strips using the set of criteria. In these embodiments, the set of criteria may include any criteria that may affect the tessellation of an area. In some embodiments, the set of criteria may include the locations of power rails or pins (e.g., $V_{DD}/V_{SS}$, V+/V−, $V_{CC}/V_{EE}$, $V_{S+}/V_{S-}$, etc.) that may be referenced to determine the locations of the strip lines. For example, given the locations of power rails, the method may estimate where the strip lines may be located such that the resulting strip may be of sufficient size to accommodate an integrated circuit even though the exact dimensions or other details about the integrated circuit is not known, especially in light of the fact that almost all modern integrated circuits have at least two pins connecting to the power rails of the circuit in which the integrated circuits are a part of, and that the at least two pins are usually located at the opposite corners of the integrated circuit.

In some embodiments, the set of criteria may include the preferred or permitted routing direction that may be used to determine the direction of tessellation. For example, if wrong-way tracks are disallowed in an area, the tessellation is to first partition an area into strips in the area. In some embodiments, the set of criteria may include characteristics of existing circuit features. For example, an existing IP block may require certain tracks with certain width(s) or spacing value(s), and thus the method described herein may use such information to determine the strip lines so that the resulting strip is of some sufficient size to accommodate the existing IP block.

In some embodiments, the set of criteria may include one or more characteristics or attributes of adjacent areas near the current area under consideration. For example, if an adjacent area includes main memory or certain circuitry that requires specific connections from or to the current area under consideration, the method may determine the strip lines for the current area such that the strips may be of sufficient size to accommodate, for example, a memory controller or a memory bus. In some embodiments, the set of criteria may include one or more characteristics of one or more adjacent layers of the current layer on which the area resides. For example, the method may identify that certain interconnect patterns or vias are or will be implemented on an adjacent layer and thus may determine the locations of the strips based on such characteristics of the adjacent layer.

In some embodiments, process 204B may tessellate an area into multiple strips by the command as follows to construct the tessellation structure such as the structures shown in FIGS. 8-9:

set_tessellation_pattern -x false -start <start> -spacing <spacing> -repeat <repeat> -layer <layer>

In some embodiments, the method may comprise the process 206B of identifying a strip from the set. In some embodiments, the method may comprise the process 208B of optionally tessellating the identified strip into multiple regions, each of which being a smaller subset of the strip. In some embodiments, process 208B tessellates a strip in a direction that is orthogonal to the direction of tessellation at 204B. In some embodiments, a strip may be arbitrarily tessellated into multiple regions. In some embodiments, process 208B may determine how to tessellate a strip into multiple regions based on a set of factors. For example, the set of factors may include one or more characteristics of one or more adjacent layers, one or more adjacent strips or areas of the current strip, existing circuit features in or within some proximity of the strip, etc. In some embodiments, at least one strip is not further tessellated into multiple regions.

In some embodiments, the method may comprise the process 210B of identifying a region from the multiple regions of a strip determined at 208B. In some embodiments, the method may comprise the process 212B of optionally mapping the region to the track pattern tessellation. In some embodiments, process 212B maps the region to the track pattern tessellation by using an outer snap to the tessellation pattern. For example, given a custom defined area on a layer, the method may construct the tessellation patterns based at least in part upon the power rails to form multiple strips or even multiple regions. The method may then perform the outer snap to snap at least a part of the boundaries of the custom defined area to the appropriate, corresponding segments along the boundaries of the strips or regions such that the enclosed area for the custom defined area is larger than that of the original before the outer snap. For example, the method may use the following command to label a region in the tessellation:

label_tessellation -region {xlo ylo xhi yhi} -name "track_pattern_name" -layer <layer>

In this example, ylo may shift or snap to the next lower tessellation pattern line (strip line) that is less than or equal to ylo, and yhi may shift or snap to the next higher tessellation pattern line (strip line) that is greater than or equal to yhi in some embodiments. In some embodiments where a given track pattern or track pattern group may have minimum/maximum dimension requirements, the tessellation process may determine the strip lines accordingly and may also determine where a strip is to be further tessellated in the second direction. For example, if the tessellation pattern spacing is uniform and equal to u, and a particular pattern group is double the height of the tessellation pattern spacing, the tessellation region may thus have yhi−ylo=2u. If two regions overlap, the latter one wins in some embodiments. In this example, process 208B may determine the region is to be no smaller than xhi−xlo and determine the tessellation structure accordingly.

In some embodiments, the method may comprise the process 214B of resolving conflict due to mapping. In the example provided immediately above, if the first region is first mapped to the track pattern tessellation before the second region is mapped to the track pattern tessellation, and if both mappings use the outer snap to the tessellation pattern such that the mapped regions overlap, process 214B may resolve the conflict (e.g., overlap) by determining that the second region that is processed after the first region wins. In some embodiments, the method may comprise the process 216B of storing the regions or the strips. In some embodiments, the method may comprise the process 206 in a substantially similar manner as that described for FIG. 2.

Figure 3:
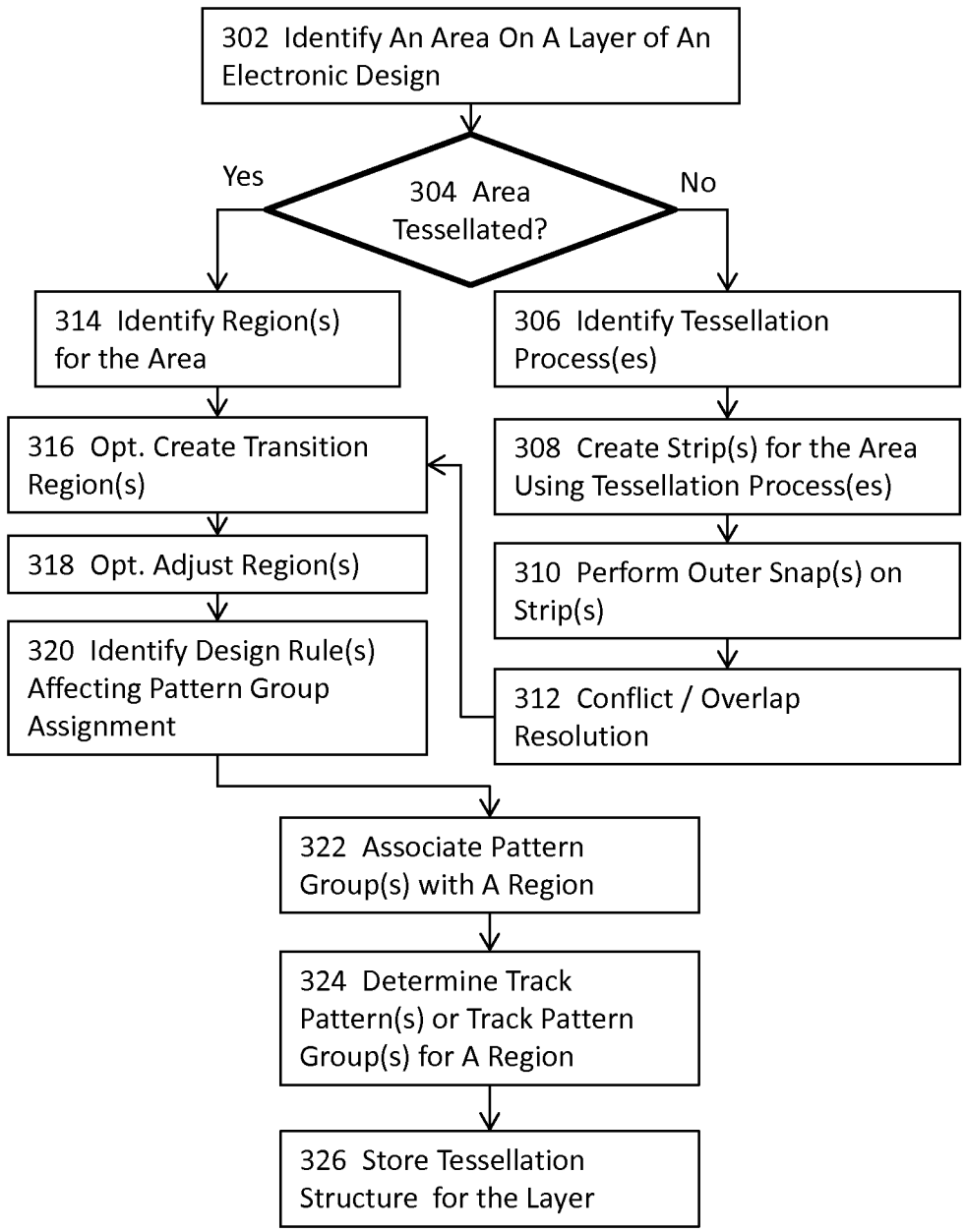
FIG. 3 illustrates a flow diagram for assigning track patterns to regions of an electronic design in some embodiments.

FIG. 3 illustrates a more detailed flow diagram for assigning track patterns to regions of an electronic design in some embodiments. In one or more embodiments, the method for assigning track patterns to regions of an electronic design may comprise the process 302 of identifying an area on a layer of an electronic design in a substantially similar manner as that described for 202 and 202A FIGS. 2 and 2A.

In some embodiments, the method may comprise the process 304 of determining whether the area identified at 302 has already been tessellated. If 304 determines that the area has been tessellated, the method may proceed to 314. Otherwise, the method may proceed to 306. In some embodiments, the method may comprise the process 306 of identifying one or more tessellation processes. Any partitioning or tessellation process that sub-divides an area into smaller sub-areas may be identified. In some embodiments, process 306 identifies the tessellation process that first tessellates an area in the first direction into multiple strips and then optionally tessellates one or more such strips into further smaller regions in the second direction.

In some embodiments, the method may comprise the process 308 of creating one or more strips for the area using the identified tessellation process. In the example illustrated above and further illustrated in FIGS. 8-9, the tessellation process identified at 308 may tessellate the area identified at 302 into one or more strips by first determining zero or more strip lines as described above. In some embodiments, the method may comprise the process 310 of performing outer snap on the one or more strips that are subject to some dimension limitations to snap one or more boundaries of a strip to the tessellation pattern in order to map the strip to the tessellation pattern.

In some embodiments, the method may comprise the process 312 of resolving conflict such as overlaps in a substantially similar manner as that described for 214B. In some embodiments where it is determined that the area identified at 302 has been tessellated, the method may comprise the process 314 of identifying one or more regions from the tessellated area. In some embodiments, the method may comprise the process 316 of optionally creating one or more transition regions or sub-areas. For example, process 316 may identify a free area to create a transition area that is to be associated with one or more track patterns to bridge, for example, a first region that is or will be associated with a first rule and a second region that is or will be associated with a second rule. In some embodiments, process 316 may construct the transition region by using, for example, the set_layer_constraint command to negotiate between the first rule of the first region and the second rule of the second region.

In some embodiments, the method may comprise the process 318 of optionally adjusting at least some of the regions in one or more strips. The adjustment of the regions may depend on one or more factors including, for example but not limited to, whether an interconnect in a region has access to a pin, whether there exist a via in a region for an interconnect to jump to an immediately adjacent layer to continue routing, one or more requirements of one or more design rules (e.g., a via cut size rule, a via enclosure rule, minimum spacing rule, width rule, etc.), one or more characteristics of one or more adjacent layers (e.g., track pattern assignment(s), existing circuit feature(s), etc.), relationship(s) between two immediately adjacent layers (e.g., start locations of track patterns on the two layers, spacing values of track patterns on these two layers, intersections of track patterns on two immediately adjacent layers, etc.), or one or more characteristics of one or more adjacent regions on the same layer (e.g., one or more design rules, track pattern assignments for these regions, existing circuit features, connectivity among these regions, etc.)

For example, a first region that is associated with 1x-track pattern(s) on the first layer and includes a 1x-width interconnect routed towards a second region that is associated with 2x-track pattern(s) may need to be adjusted based on, for example, whether the interconnect at issue has access to a pin for termination. If the interconnect at issue does not have such access, process 318 may further determine whether there is sufficient overlap between the first region and a third region on an immediately adjacent layer to accommodate a via such that the interconnect at issue may jump to the immediately adjacent layer and perhaps jumps back to the current layer to avoid track violation in the second region. Process 318 may base such a determination on, for example, the overlap between the two regions on these two immediately adjacent layers, the requirements governing the via (e.g., a via cut size rule, via enclosure rule, etc.)

In some embodiments, the method may comprise the process 320 of identifying one or more design rules that may affect pattern group assignment. For example, process 320 may identify one or more design rules requiring or desiring certain requirements that are explicitly specified or implicitly derived from the track pattern. For example, a customer provided track pattern may require a specific arrangement of tracks at a certain spacing or the tracks in the track pattern may only be used to implement interconnects of certain width(s). These requirements may be explicitly specified (e.g., by the "-spacing" attribute governing the pitch of the tracks) or implicitly derived from the track pattern (e.g., the customer may require 1x-width interconnects for the tracks, or the track pattern may have a name that suggests 1x-width interconnects for the tracks such as "TP_M1_1x" suggesting 1x-tracks in the track pattern.

In some embodiments, the method may comprise the process 322 of associating one or more track patterns or one or more track pattern groups with a region. Process 322 may be performed in substantially similar manners as those described for 206 of FIG. 2 or 212A of FIG. 2A. In some embodiments, the method may comprise the process 324 of determining or locking a track pattern or a track pattern group for a region. For example, when an electronic design is first opened for implementation, no circuit features exist in the electronic design, and hence none in the regions. A track pattern may generally require a specific arrangement of tracks and has a specific width requirement (e.g., 2x-width for interconnects implemented with the tracks in the track pattern). Nonetheless, the track pattern may not prohibit other tracks with different, non-conflicting requirements. Therefore, all matching track patterns are available at this early stage of implementation. As more circuit features are added into a region, the characteristics of the added circuit features or the associated rules (e.g., placement rules, routing rules, etc.) may further limit the compatibility and thus the availability of track patterns that may be associated with or assigned to the region. In some embodiments, process 324 may thus lock a track pattern or a track pattern group for a region such that the region is to be implemented to comply with the requirements of the locked track pattern or track pattern group.

In some embodiments, the method may comprise the process 326 of storing the tessellation structure for the region, the area, or the layer on which the region reside. Exemplary tessellation structures are shown in FIGS. 8-9. The tessellation structure may include or may be associated with information or data about the strips or regions, their respective assignment of or association with track patterns, various constraints and rules associated with or arising out of the associated track patterns or track pattern groups.

Figure 4:
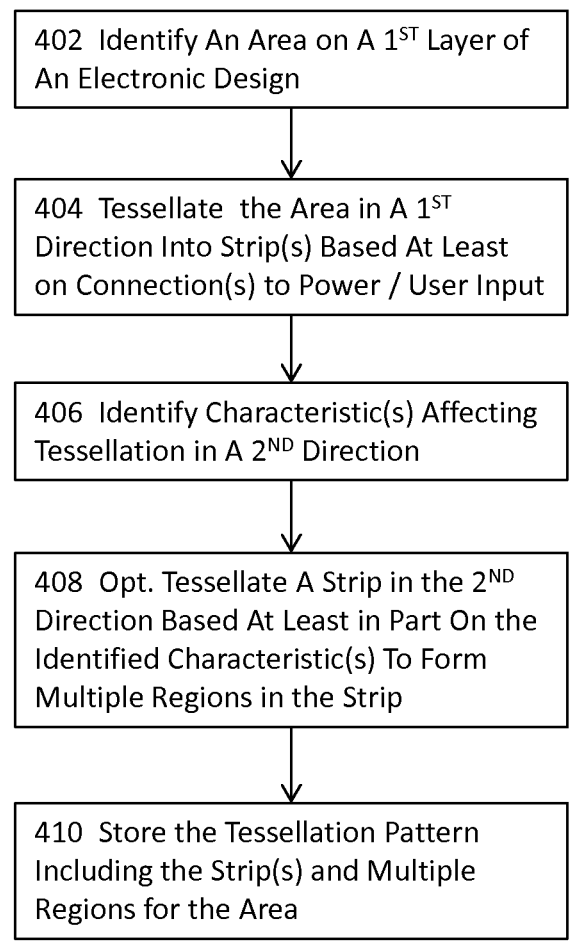
FIG. 4 illustrates a flow diagram for assigning track patterns to regions of an electronic design in some embodiments.

FIG. 4 illustrates a flow diagram for assigning track patterns to regions of an electronic design in some embodiments. In essence, FIG. 4 illustrates an abstracted, higher level flow diagram for the flow described in FIG. 3. In one or more embodiments, the method for assigning track patterns to regions of an electronic design may comprise the process 402 of identifying an area on a first layer of an electronic design. Process 402 may be performed in substantially similar manner as those described for 302 of FIG. 3 or 202 of FIG. 2. In some of these embodiments, the method may comprise the process 404 of tessellating the area in a first direction into multiple strips based at least on one or more connections to power rails or pins or on user input. Process 404 may be performed in substantially similar manner as those described for 204B of FIG. 2B, 208A of FIG. 2A, 306 and 308 of FIG. 3.

In some of these embodiments, the method may comprise the process 406 of identifying one or more characteristics that may affect tessellation in a second direction. Some examples of the one or more characteristics may include, characteristics of arising out of one or more neighboring areas or one or more adjacent layers such as connectivity requirements or information, existing features in any of the region on any layers, various design rules including width rule(s), spacing rule(s), layer or track pattern constraint(s), etc. The one or more characteristics may also include those described for 318 of FIG. 3 or 208B of FIG. 2B. In some of these embodiments, the method may comprise the process 408 of optionally tessellating a strip in the second direction based at least in part on the identified one or more characteristics to form multiple regions in the strip. Process 408 may be performed in substantially similar manner as those described for 208B of FIG. 2B.

Figure 5:
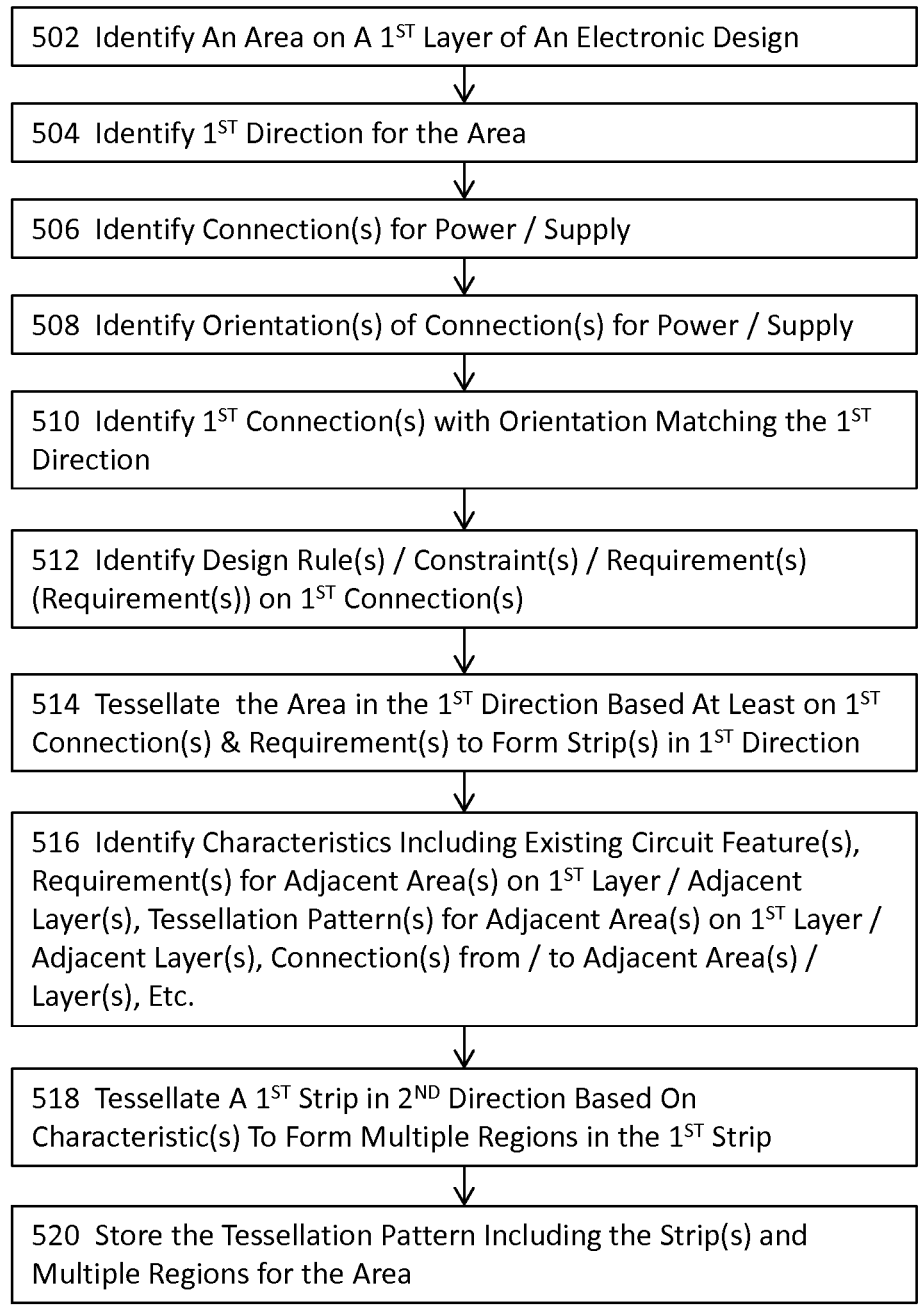
FIG. 5 illustrates a more detailed flow diagram for assigning track patterns to regions of an electronic design in some embodiments.

In some of these embodiments, the method may comprise the process 410 of storing the tessellation pattern including the strips or multiple regions for the area. Process 410 may be performed in substantially similar manner as those described for 326 of FIG. 3 or 206 of FIG. 2. FIG. 5 illustrates a more detailed flow diagram for assigning track patterns to regions of an electronic design in some embodiments. In one or more embodiments, the method for assigning track patterns to regions of an electronic design may comprise the process 502 of identifying an area on a $1^{st}$ layer of an electronic design. Process 502 may be performed in substantially similar manners as those described for 200 of FIG. 2, 202A of FIG. 2A, 302 of FIG. 3, or 402 of FIG. 4.

In some embodiments, the method may comprise the process 504 of identifying first direction for the area. In some embodiments, the first direction comprises a preferred direction or a permitted direction for the layer on which the area identified at 502 resides. In some embodiments, the method may comprise the process 506 of identifying one or more power or supply rails or pins or connectivity requirements or information thereof. In some embodiments, the method may comprise the process 508 of identifying one or more orientations of the connections for the power or supply rails or pins. For example, process 508 may identify the power or supply rails in the orientation that is aligned with the preferred direction or the permitted direction (where wrong-way tracks are prohibited). In some embodiments, the method may comprise the process 510 of identifying one or more first connections having an orientation that match the first direction.

In some embodiments, the method may comprise the process 512 of identifying one or more design rules, one or more constraints, or one or more requirements (collectively "requirements") on the one or more first connections. For example, process 512 may identify a requirement requiring 3x-width for the power rails, a spacing requirement, or a routing requirement, etc. In some embodiments, the method may comprise the process 514 of tessellating the area identified at 502 in the first direction based at least in part on the one or more first connections and the one or more requirements to form multiple strips in the first direction. Process 514 may be performed in substantially similar manners as those described for 208A of FIG. 2A, 204B of FIG. 2B, 306 and 308 of FIG. 3, or 404 of FIG. 4.

In some embodiments, the method may comprise the process 516 of identifying one or more characteristics that may affect tessellation of a strip in a second direction. Exemplary characteristics may include, for example but not limited to, one or more existing circuit features in a strip, the area, one or more adjacent areas, or one or more adjacent layers in some embodiments. In addition or in the alternative, exemplary characteristics may include one or more requirements for one or more adjacent areas on the first layer itself or on one or more adjacent layers in some embodiments. Exemplary characteristics may include the tessellation patterns for one or more adjacent areas on the first layer or for areas on one or more adjacent layers, one or more connections routed from or to one or more adjacent areas or one or more adjacent layers, etc. in some embodiments. Other characteristics are described in 318 of FIG. 3

In some embodiments, the method may comprise the process 518 of tessellating a first strip in the second direction based at least in part on one or more characteristics identified at 516 to form multiple regions for the first strip. Process 518 may be performed in substantially similar manners as those described for 208B of FIG. 2B or 408 of FIG. 4. In some embodiments, the method may comprise the process 520 of storing the tessellation pattern including the strip(s) and multiple regions for the area in substantially similar manners as those described for 410 of FIG. 4, 326 of FIG. 3, or 206 of FIG. 2.

Figure 6:
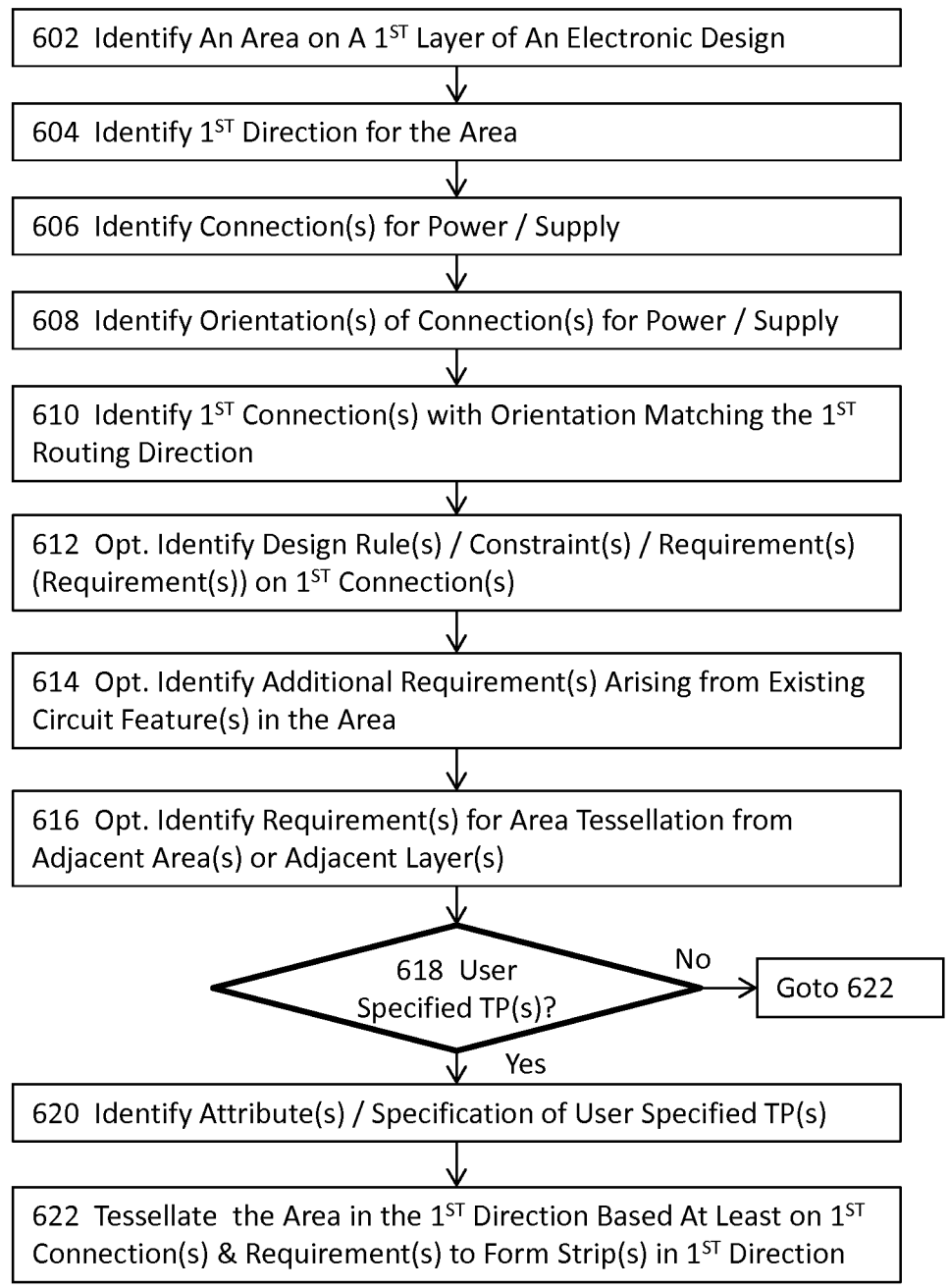
FIG. 6 illustrates a more detailed flow diagram for assigning track patterns to regions of an electronic design in some embodiments.

FIG. 6 illustrates a more detailed flow diagram for assigning track patterns to regions of an electronic design in some embodiments. In one or more embodiments, the method for assigning track patterns to regions of an electronic design may comprise the process 602 of identifying an area on a 1$^{st}$ layer of an electronic design. Process 602 may be performed in substantially similar manners as those described in FIGS. 2-5. In some embodiments, the method may comprise the process 604 of identifying a first direction for the area in a substantially similar manner as that described for 504 in FIG. 5. In some embodiments, the method may comprise the process 606 of identifying one or more power or supply rails or pins or connectivity requirements or information thereof in a substantially similar manner as that described for 506 in FIG. 5.

In some embodiments, the method may comprise the process 608 of identifying one or more orientations of the connections for the power or supply rails or pins in a substantially similar manner as that described for 508 of FIG. 5. For example, process 608 may identify the power or supply rails in the orientation that is aligned with the preferred direction or the permitted direction (where wrong-way tracks are prohibited). In some embodiments, the method may comprise the process 610 of identifying one or more first connections having an orientation that match the first direction. In some embodiments, the method may comprise the process 612 of optionally identifying one or more design rules, one or more constraints, or one or more requirements on the one or more first connections. For example, process 612 may identify a requirement requiring 3x-width for the power rails, a spacing requirement, or one or more routing rules, etc.

In some embodiments, the method may comprise the process 614 of optionally identifying one or more additional requirements arising from existing circuit features in the area. For example, an existing IP block in the area may require one or more specific track patterns for implementation and thus affect the assignment or association of track patterns or track pattern groups for the area. In some embodiments, the method may comprise the process 616 of optionally identifying one or more requirements for area tessellation from one or more adjacent areas or one or more adjacent layers. The one or more requirements may include those described in 516 of FIGS. 5 and 318 of FIG. 3.

In some embodiments, the method may comprise the process 618 of determining whether there are one or more user specified track patterns or track pattern groups such as a track pattern or track pattern group provided by a customer or a foundry. In some embodiments where process 618 determines that there are one or more user specified track patterns or track pattern groups, the method may proceed to 620. Otherwise, the method may proceed to 622. In some embodiments, the method may comprise the process 620 of identifying one or more attributes or the specifications of the one or more user specified track patterns or track pattern groups. For example, process 620 may by itself or in conjunction with one or more other tools to parse or interpret a user specified track pattern or track pattern group to retrieve attributes including spacing value(s), start location(s), width requirement(s) for tracks, the number(s) of repetitions of track pattern(s), etc. In some embodiments, the method may use such one or more attributes to determine or estimate the size of an area in order to properly accommodate the circuit features inside the area.

In some embodiments, the method may comprise the process 622 of tessellating the area in the first direction based at least in part on one or more first connections identified at 610, one or more requirements identified at 612, 614, or 616, the orientation identified at 608, or the one or more connections to power rails or pins to create one or more strips in the first direction. Process 622 may be performed in substantially similar manners as those described for 514 of FIG. 5, 404 of FIGS. 4, 306 and 308 of FIG. 3, 204B of FIG. 2B, or 208A of FIG. 2A.

Figure 7:
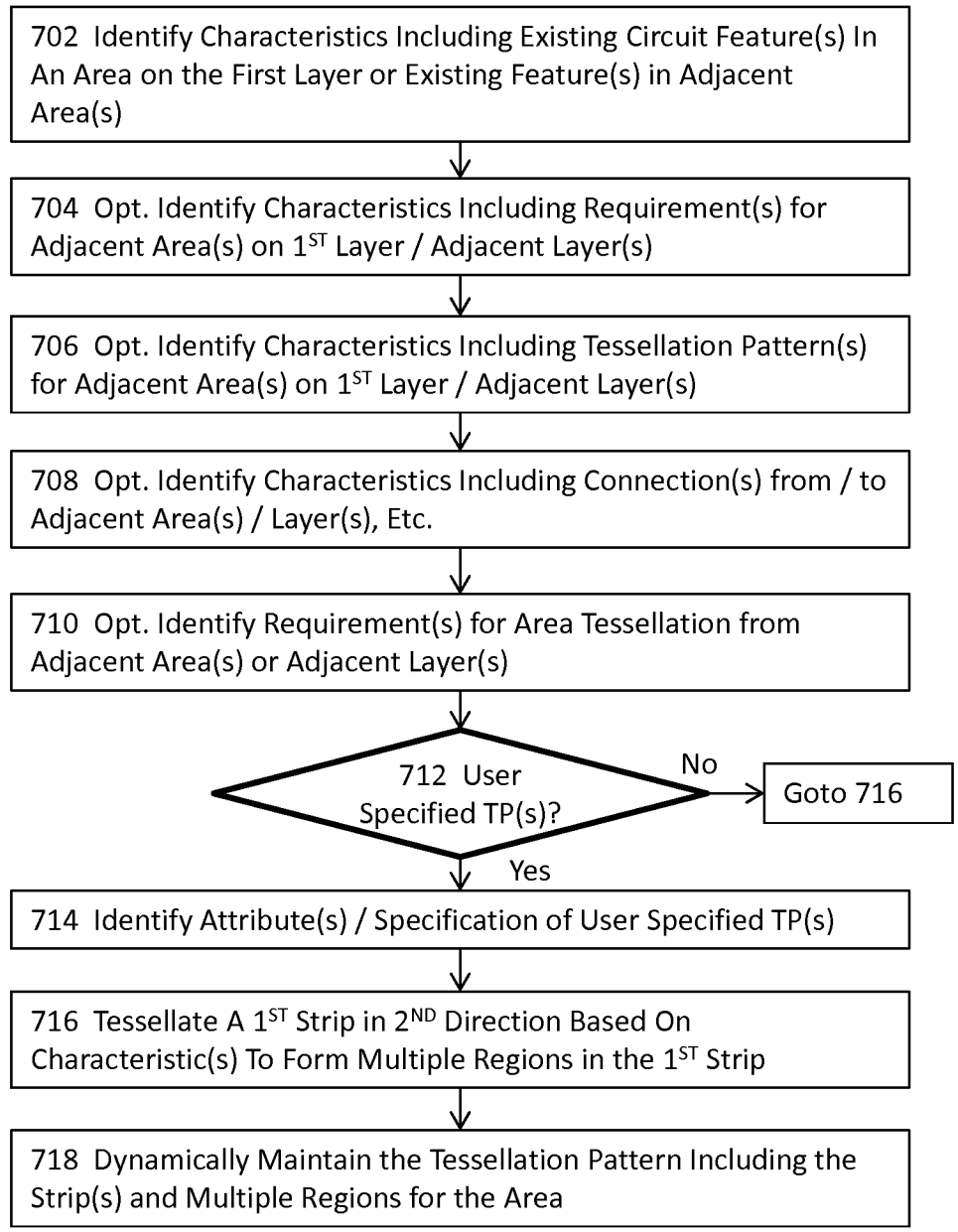
FIG. 7 illustrates a more detailed flow diagram for assigning track patterns to regions of an electronic design in some embodiments.

FIG. 7 illustrates a more detailed flow diagram for assigning track patterns to regions of an electronic design in some embodiments. In one or more embodiments, the method for assigning track patterns to regions of an electronic design may comprise the process 702 of identifying one or more characteristics including one or more existing circuit features in an area on a first layer, in one or more adjacent areas on the same layer as the area, or in one or more areas on one or more adjacent layers. The one or more characteristics may include one or more of those described in 202B, 204B, 206B, 208B of FIG. 2B, 318 of FIG. 3, 406 of FIG. 4, 516 of FIG. 5, or 614 of FIG. 6.

In some embodiments, the method may comprise the process 704 of optionally identifying one or more characteristics including one or more requirements for one or more adjacent areas on the first layer or one or more requirements associated with one or more adjacent layers. The one or more characteristics may include one or more of those described in 206 of FIG. 2, 206A of FIG. 2A, 318 or 320 406 of FIG. 4, 512 or 514 of FIG. 5, or 612 of FIG. 6.

In some embodiments, the method may comprise the process 706 of optionally identifying one or more characteristics including characteristic(s) or attribute(s) explicitly associated with or implicitly derived from one or more tessellation patterns or tessellation structures for one or more adjacent areas on the first layer or on one or more adjacent layers. Some exemplary characteristics may include one or more of those described for 318 of FIG. 3. For example, the one or more characteristics may include one or more of whether an interconnect in a region has access to a pin, whether there exist a via in a region for an interconnect to jump to an immediately adjacent layer to continue routing, one or more requirements of one or more design rules (e.g., a via cut size rule, a via enclosure rule, minimum spacing rule, width rule, etc.), one or more characteristics of one or more adjacent layers (e.g., track pattern assignment(s), existing circuit feature(s), etc.), relationship(s) between two immediately adjacent layers (e.g., start locations of track patterns on the two layers, spacing values of track patterns on these two layers, intersections of track patterns on two immediately adjacent layers, etc.), or one or more characteristics of one or more adjacent regions on the same layer (e.g., one or more design rules, track pattern assignments for these regions, existing circuit features, connectivity among these regions, etc.)

In some embodiments, the method may comprise the process 708 of optionally identifying one or more characteristics including characteristic(s) of one or more connections or interconnects being implemented or routed from or to one or more adjacent areas or one or more adjacent layers, etc. the one or more characteristics may include one or more of those described for 202B of FIG. 2B, 318 of FIG. 3, or 516 of FIG. 5. In some embodiments, the method may comprise the process 710 of optionally identifying one or more requirements for area tessellation from one or more adjacent areas or one or more adjacent layers. For example, the one or more requirements may include one or more tessellation patterns, one or more tessellation structures, one or more track patterns, one or more track pattern groups, one or more rules or constraints associated with or arising from any track pattern or track pattern groups on the same layer or on different layer(s) in some embodiments. In addition or in the alternative, the one or more requirements may include area correlations or relationships between the first area and one or more adjacent areas on the same layer, area correlations or relationships between the first area on the first layer and one or more areas in one or more adjacent areas, etc. in some embodiments.

In some embodiments, the method may comprise the process 712 of determining whether there are one or more user specified track patterns. Process 712 may be performed in a substantially similar manner as that described for 618 of FIG. 6. In some embodiments, the method may comprise the process 714 of identifying one or more attributes or the specifications of the one or more user specified track patterns or track pattern groups. For example, process 714 may by itself or in conjunction with one or more other tools to parse or interpret a user specified track pattern or track pattern group to retrieve attributes including spacing value(s), start location(s), width requirement(s) for tracks, the number(s) of repetitions of track pattern(s), etc. In some embodiments, the method may use such one or more attributes to determine or estimate the size of an area in order to properly accommodate the circuit features inside the area.

In some embodiments, the method may comprise the process 716 of tessellating a first strip in a second direction based at least in part on one or more characteristics or one or more requirements respectively identified at 702, 704, 706, 708, or 710 to form multiple regions in the first strip. In some embodiments, the second direction comprises the second direction that is orthogonal or at an angle to the first direction, regardless of whether or not various design rules allow only one routing direction (e.g., interconnects are to be implemented using only the right-way tracks) or both routing directions (e.g., interconnects may be implemented using both the right-way tracks and the wrong-way tracks.) It shall be noted that in 716, the second direction is to determine the orientation of further tessellation for a strip and is not used to determine physical implementation (e.g., routing). Consequently, whether or not various design rules allow one or both routing directions is of no particular significance in tessellation of a strip in the second direction although the strip is formed by tessellation in the first direction.

In some embodiments, the method may comprise the process 718 of dynamically maintaining the tessellation patterns or the tessellation structure that includes one or more strips or multiple regions for the area. Some embodiments dynamically maintains the tessellation patterns or the tessellation structure because, as described in FIG. 3, when more circuit features are added into a region, the characteristics of the added circuit features or the associated rules (e.g., placement rules, routing rules, etc.) may further limit or change the compatibility of certain track patterns or track pattern groups, and thus the availability of track patterns or track pattern groups that may be associated with or assigned to the region may also change accordingly. In addition or in the alternative, the tessellation patterns may be modified during the implementation of the design for functional, performance, manufacturability, or cost concerns. Consequently, process 718 may be used to dynamically track and maintain the tessellation patterns or tessellation structures to cope with such changes or modifications in some embodiments.

Figure 8:
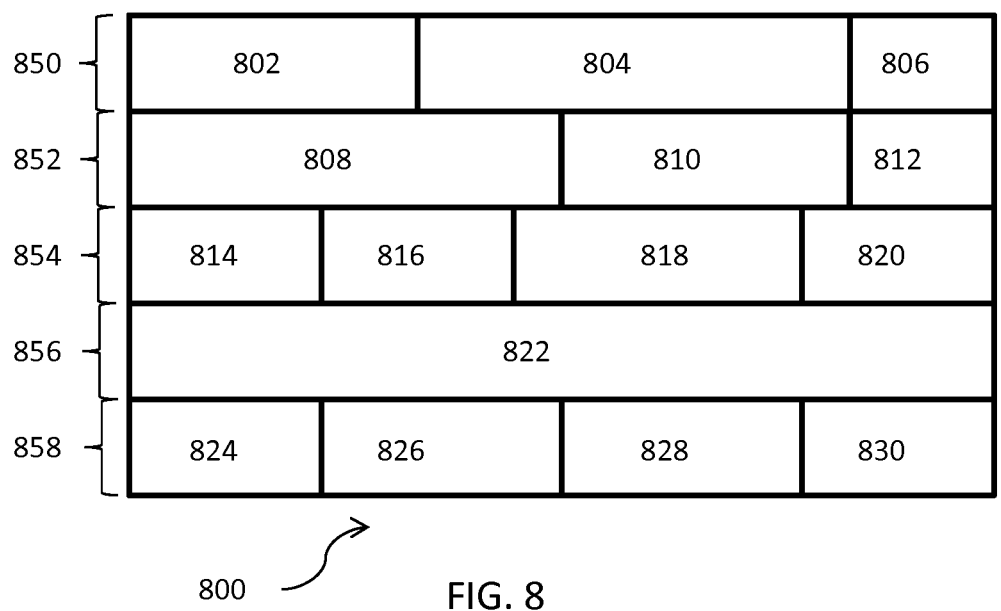
FIG. 8 illustrates an exemplary tessellation pattern of an area in an electronic design in some embodiments.

FIG. 8 illustrates an exemplary tessellation pattern of an area in an electronic design in some embodiments. In this exemplary tessellation pattern or tessellation structure shown in FIG. 8, the area 800 is first tessellated into five strips 850, 852, 854, 856, and 858. Among the five strips, four of the five strips are further tessellated into multiple regions. For example, the strip 850 is tessellated into regions 802, 804, and 806; the strip 852 is tessellated into regions 808, 810, and 812; the strip 854 is tessellated into regions 814, 816, and 818; and the strip 854 is tessellated into regions 824, 826, 828, and 830. Strip 856 is not further tessellated into smaller regions. The methods described herein may then treat the entire strip 856 as a single region 822 in the tessellation structure. In addition or in the alternative, each of the region may optionally be labeled in a substantially similarly manner as that described in 210B of FIG. 2. For example, regions 804, 810, 814, 818, 822, 826, 830 may be labeled with "1X+2X" track pattern name to indicate a mix of single-width and double-width track patterns in each of these regions. The remaining regions may be labeled, for example, "1X", "2X", or any other types of track pattern names to indicate their respective association with the corresponding track patterns or track pattern groups.

Figure 9:
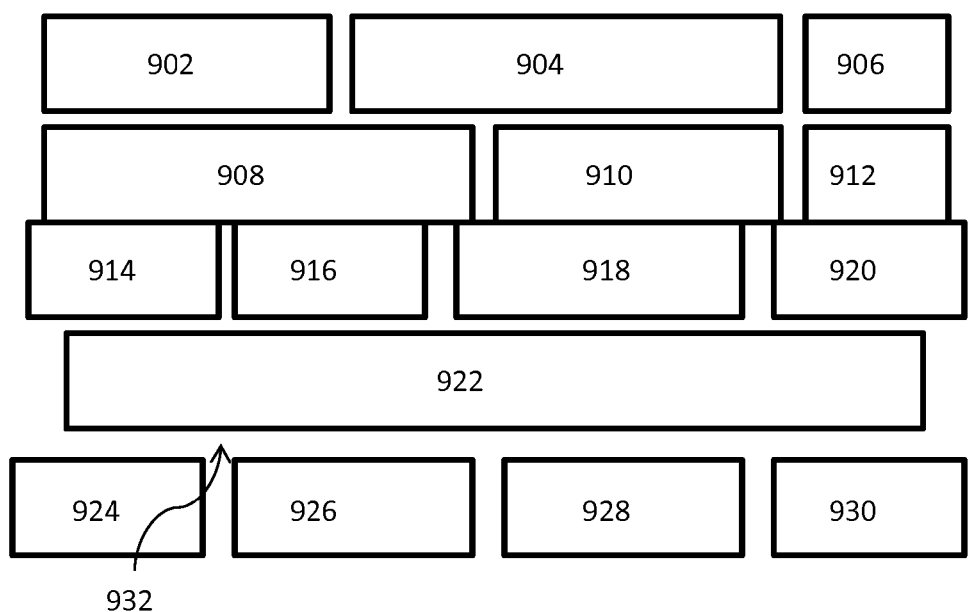
FIG. 9 illustrates another exemplary tessellation pattern of an area in an electronic design in some embodiments.

FIG. 9 illustrates another exemplary tessellation pattern of an area in an electronic design in some embodiments. FIG. 9 illustrates a similar tessellation patterns including regions 902, 904, 906, 908, 910, 912, 914, 916, 918, 920, 922, 924, 926, 928, and 930. In addition, FIG. 9 illustrates that the boundaries of a region or strip need not coincide with those of other regions or strips in all cases. Rather, a tessellated area may also include free space (e.g., 932) in some cases. The free space indicates that free-form implementation in this space is permitted and need not conform to any track pattern requirements. In some embodiments, some processes described herein (e.g., 316) may use the free space for one or more transition regions to bridge two regions or strips that are associated with, for example, different requirements in some embodiments. In some other embodiments where the design itself or the controlling design rules permit, the method may also use vias to jump to another layer and optionally return to the same layer to complete the implementation, without using a transition region.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

SYSTEM ARCHITECTURE OVERVIEW

Figure 10:
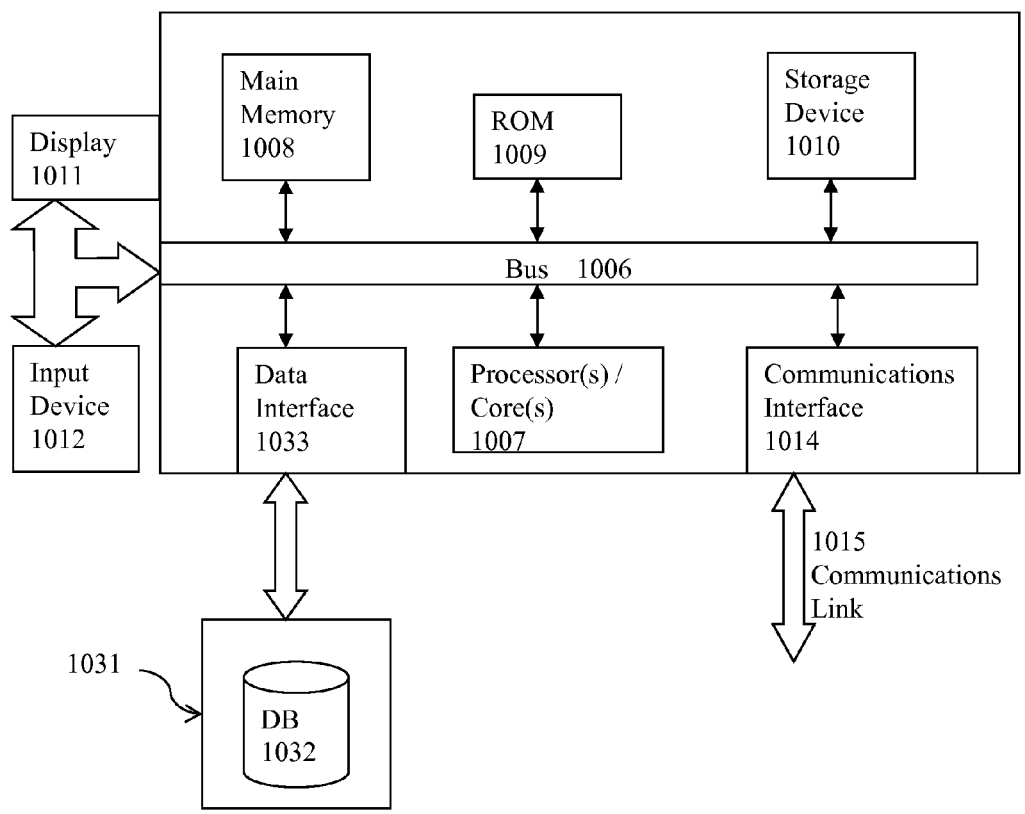
FIG. 10 illustrates a computerized system on which a method for associating track patterns with rules for electronic designs may be implemented.

FIG. 10 illustrates a block diagram of an illustrative computing system 1000 suitable for assigning track patterns to regions of an electronic design as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with track patterns, comprising:

using a computing system having at least one processor or at least one processor core to perform a process, the process comprising:

identifying an area on a layer of an electronic design;

a tessellation mechanism coupled to the at least one processor or the at least one processor core of the computing system and identifying or creating multiple sub-areas for the area; and automatically associating a track pattern or a track pattern group with a sub-area of the multiple sub-areas, wherein the track pattern or track pattern group comprises one or more routing tracks that are associated with one or more widths of circuit component designs implemented along at least one routing track of the one or more routing tracks.

2. The computer implemented method of claim 1, the act of identifying or creating multiple sub-areas further comprising:
determining whether the area has already been tessellated, wherein at least one sub-area of the multiple sub-areas comprises a strip or a region that is obtained from a tessellation process.

3. The computer implemented method of claim 1, the process further comprising:
maintaining a tessellation structure for the area; and
updating the tessellation structure during implementation of at least the area in the electronic design.

4. The computer implemented method of claim 1, the act of identifying or creating the multiple sub-areas for the area further comprising:
identifying a first strip or region from an existing tessellation structure;
tessellating the first strip or region into multiple first regions based at least in part on a set of criteria in a second direction that is different from a first direction that is used to form the first strip or region in the area; and
updating the existing tessellation structure with the multiple first regions.

5. The computer implemented method of claim 1, the act of identifying or creating the multiple sub-areas for the area further comprising:
identifying or determining whether there is an existing circuit feature in a first strip or region;
identifying or determining one or more characteristics of the existing circuit feature; and
incorporating the one or more characteristics of the existing circuit feature in a set of criteria for identifying or creating the multiple sub-areas.

6. The computer implemented method of claim 1, the act of identifying or creating the multiple sub-areas for the area further comprising:
identifying or determining a first adjacent area that is within a first distance from the area on the layer;
identifying or determining one or more first characteristics associated with the first adjacent area; and
incorporating the one or more first characteristics associated with the first adjacent area in a set of criteria for identifying or creating the multiple sub-areas.

7. The computer implemented method of claim 1, wherein the adjacent area is situated on a same layer on which the area is situated or on a different layer.

8. The computer implemented method of claim 1, the act of identifying or creating the multiple sub-areas for the area further comprising:
identifying one or more characteristics related to the electronic design; and
tessellating the area or the layer into one or more strips in a first direction based at least in part upon the one or more characteristics.

9. The computer implemented method of claim 8, the act of identifying or creating the multiple sub-areas for the area further comprising:
identifying a set of factors related to tessellation in a second direction;
tessellating a strip in the one or more strips in the second direction to form multiple second regions based at least in part on the set of factors; and
updating the existing tessellation structure with the multiple second regions.

10. A system for implementing an electronic design with track patterns, comprising:
a computing system having at least one processor or at least one processor core that is to:
identify an area on a layer of an electronic design;
identify or create, at a tessellation mechanism coupled to the at least one processor or the at least one processor core of the computing system, multiple sub-areas for the area; and
automatically associate a track pattern or a track pattern group with a sub-area of the multiple sub-areas, wherein the track pattern or track pattern group comprises one or more routing tracks that are associated with one or more widths of circuit component designs implemented along at least one routing track of the one or more routing tracks.

11. The system of claim 10, in which the at least one processor or at least one processor core that is to identify or create the multiple sub-areas is further to:
determine whether the area has already been tessellated, wherein at least one sub-area of the multiple sub-areas comprises a strip or a region that is obtained from a tessellation process.

12. The system of claim 10, in which the at least one processor or at least one processor core that is to identify or create the multiple sub-areas for the area is further to execute one or more sets of instructions of a plurality of sets of instructions to identify or create the multiple sub-areas for the area, wherein:
a first set of instructions of the plurality of sets of instructions comprises a first sequence of instructions which, when executed by the at least one processor, causes the at least one processor to:
identify a first strip or region from an existing tessellation structure;
tessellate the first strip or region into multiple first regions based at least in part on a set of criteria in a second direction that is different from a first direction that is used to form the first strip or region in the area; and
update the existing tessellation structure with the multiple first regions; and
a second set of instructions of the plurality of sets of instructions comprises a first sequence of instructions which, when executed by the at least one processor, causes the at least one processor to:
identify or determine whether there is an existing circuit feature in the first strip or region;
identify or determine one or more characteristics of the existing circuit feature; and
incorporate the one or more characteristics of the existing circuit feature in the set of criteria.

13. The system of claim 10, in which the at least one processor or at least one processor core that is to identify or create the multiple sub-areas for the area is further to execute one or more sets of instructions of a plurality of sets of instructions to identify or create the multiple sub-areas for the area, wherein:
a third set of instructions of the plurality of sets of instructions comprises a first sequence of instructions which, when executed by the at least one processor, causes the at least one processor to:
  identify or determine a first adjacent area that is within a distance from the area on the layer;
  identify or determine one or more characteristics associated with the first adjacent area; and
  incorporate the one or more characteristics associated with the first adjacent area in a set of criteria; and
a fourth set of instructions of the plurality of sets of instructions comprises a first sequence of instructions which, when executed by the at least one processor, causes the at least one processor to:
  identify or determine a first adjacent layer;
  identify or determine one or more characteristics associated with the first adjacent layer; and
  incorporate the one or more characteristics associated with the first adjacent layer in the set of criteria.

14. The system of claim 10, in which the at least one processor or at least one processor core that is to identify or create the multiple sub-areas for the area is further to execute one or more sets of instructions of a plurality of sets of instructions to identify or create the multiple sub-areas for the area, wherein:
  identify one or more characteristics related to the electronic design; and
  tessellate the area or the layer into one or more strips in a first direction based at least in part upon the one or more characteristics, wherein the at least one processor or at least one processor core that is to identify or create the multiple sub-areas for the area is further to:
    identify a set of factors related to tessellation in a second direction;
    tessellate a strip in the one or more strips in the second direction to form multiple second regions based at least in part on the set of factors; and
    update the existing tessellation structure with the multiple second regions.

15. An article of manufacture comprising a non-transitory computer accessible storage medium having stored thereupon a sequence of instructions which, when executed by at least one processor or at least one processor core executing one or more threads, causes the at least one processor or the at least one processor core to perform a method for implementing an electronic design with track patterns, the method comprising:
  using at least one processor or at least one processor core to perform a process the process comprising:
  identifying an area on a layer of an electronic design;
  a tessellation mechanism coupled to the at least one processor or the at least one processor core of the computing system and identifying or creating multiple sub-areas for the area; and
  automatically associating a track pattern or a track pattern group with a sub-area of the multiple sub-areas, wherein the track pattern or track pattern group comprises one or more routing tracks that are associated with one or more widths of circuit component designs implemented along at least one routing track of the one or more routing tracks.

16. The article of manufacture of claim 15, the act of identifying or creating multiple sub-areas further comprising:
  determining whether the area has already been tessellated, wherein at least one sub-area of the multiple sub-areas comprises a strip or a region obtained from a tessellation process;
  maintaining a tessellation structure for the area; and
  updating the tessellation structure during implementation of at least the area in the electronic design.

17. The article of manufacture of claim 15, the act of identifying or creating the multiple sub-areas for the area further comprising:
  performing one or more sub-processes of a plurality of sub-processes, wherein
  a first sub-process of the plurality of sub-processes comprises:
    identifying a first strip or region from an existing tessellation structure;
    tessellating the first strip or region into multiple first regions based at least in part on a set of criteria in a second direction that is different from a first direction that is used to form the first strip or region in the area; and
    updating the existing tessellation structure with the multiple first regions; and
  a second sub-process of the plurality of sub-processes comprises:
    identifying or determining whether there is an existing circuit feature in the first strip or region;
    identifying or determining one or more characteristics of the existing circuit feature; and
    incorporating the one or more characteristics of the existing circuit feature in the set of criteria.

18. The article of manufacture of claim 15, the act of identifying or creating the multiple sub-areas for the area further comprising:
  performing one or more sub-processes of a plurality of sub-processes to identify or create the multiple sub-areas, wherein
  the third sub-process of the plurality of sub-processes comprises:
    identifying or determining a first adjacent area that is within a distance from the area on the layer;
    identifying or determining one or more characteristics associated with the first adjacent area; and
    incorporating the one or more characteristics associated with the first adjacent area in a set of criteria; and
  a fourth sub-process of the plurality of sub-processes comprises:
    identifying or determining a first adjacent layer;
    identifying or determining one or more characteristics associated with the first adjacent layer; and
    incorporating the one or more characteristics associated with the first adjacent layer in the set of criteria.

19. The article of manufacture of claim 15, the act of identifying or creating the multiple sub-areas for the area further comprising:
  performing a fifth sub-process of a plurality of sub-processes, wherein the fourth sub-process of the plurality of sub-processes comprises:
    Identifying one or more characteristics related to the electronic design; and
    tessellating the area or the layer into one or more strips in a first direction based at least in part upon the one or more characteristics.

20. The article of manufacture of claim 19, the act of identifying or creating the multiple sub-areas for the area further comprising:
  identifying a set of factors related to tessellation in a second direction;
  tessellating a strip in the one or more strips in the second direction to form multiple second regions based at least in part on the set of factors; and
  updating the existing tessellation structure with the multiple second regions.

* * * * *